United States Patent

[11] 3,561,778

| [72] | Inventor | Edward G. La Brie<br>53 Chaney Ave., Tupper Lake, N.Y. 12986 |
|---|---|---|
| [21] | Appl. No. | 710,862 |
| [22] | Filed | Mar. 6, 1968 |
| [45] | Patented | Feb. 9, 1971 |

[54] THREE WHEELED VEHICLE
1 Claim, 6 Drawing Figs.

[52] U.S. Cl. .................................................. 280/7.14,
280/269, 280/282, 280/16, 280/12.14
[51] Int. Cl. ....................................................... B62k 21/02,
B62k 9/02
[50] Field of Search............................................ 280/7.1,
7.14, 7.15, 12.14, 16, 269, 268, 267, 282

[56] References Cited
UNITED STATES PATENTS
527,903  10/1894  Thanner....................... 280/7.14

| 2,884,259 | 4/1959 | Snodgrass..................... | 280/269X |
|---|---|---|---|
| 3,203,706 | 8/1965 | Boyden ........................ | 280/7.12 |

FOREIGN PATENTS

| 1,078,044 | 5/1954 | France. | 280/267 |
|---|---|---|---|
| 11,300 | 1910 | Great Britain. | 280/267 |

*Primary Examiner*—Leo Friaglia
*Assistant Examiner*—Milton L. Smith

ABSTRACT: A novel tricycle having a rear wheel which is pedal and chain driven, the front end of the vehicle having a pair of parallel forks to carry the front wheels which are steerable by a handlebar's upper portion. The front wheels of this tricycle are of such construction as to allow the rider when stopped to maintain balance without removing his feet from the pedals. This vehicle also allows the rider to bank into a turn and provide maximum safety for the rider at higher speeds which cannot be attained with the conventional tricycle-type of vehicle.

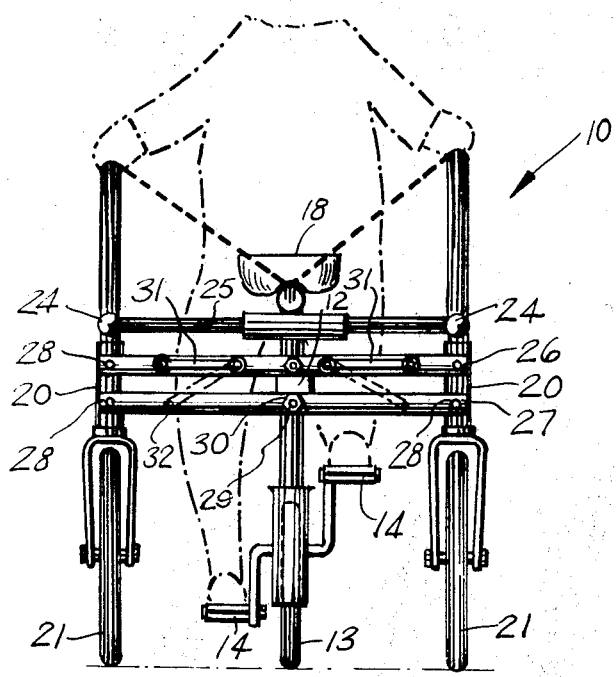
Fig. 1
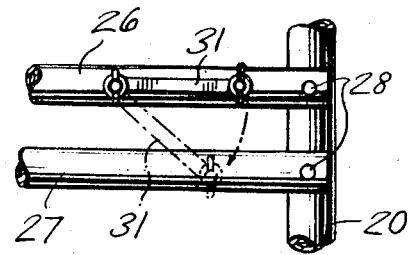
Fig. 3.
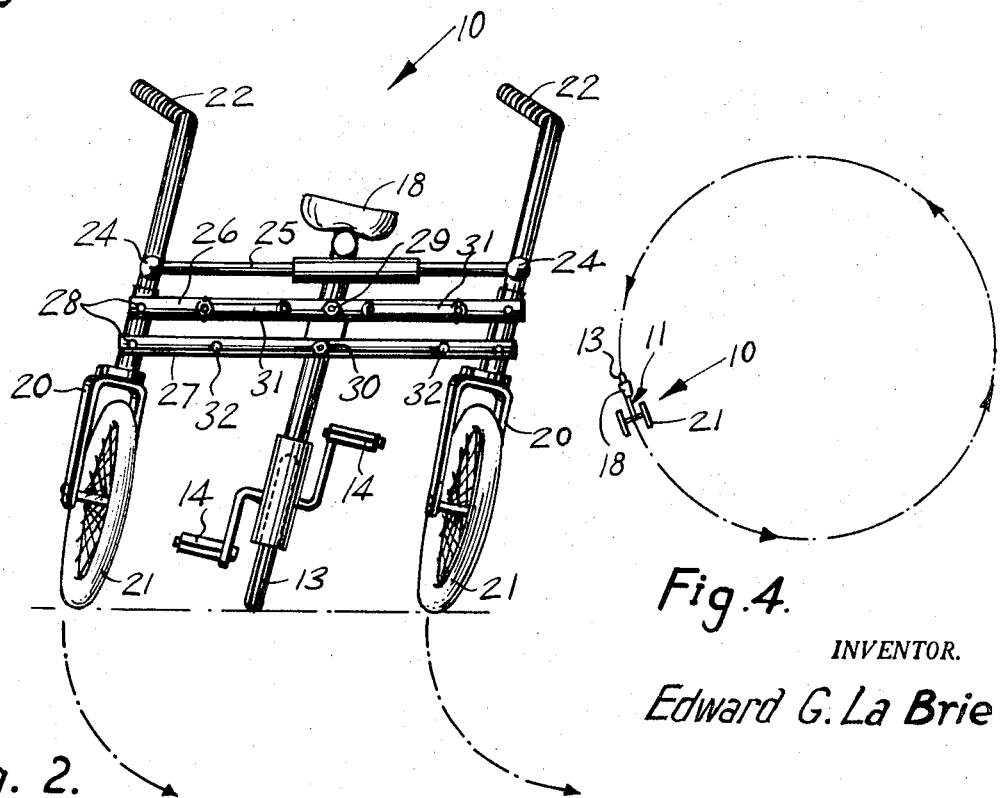
Fig. 2.
Fig. 4.
INVENTOR.
Edward G. La Brie

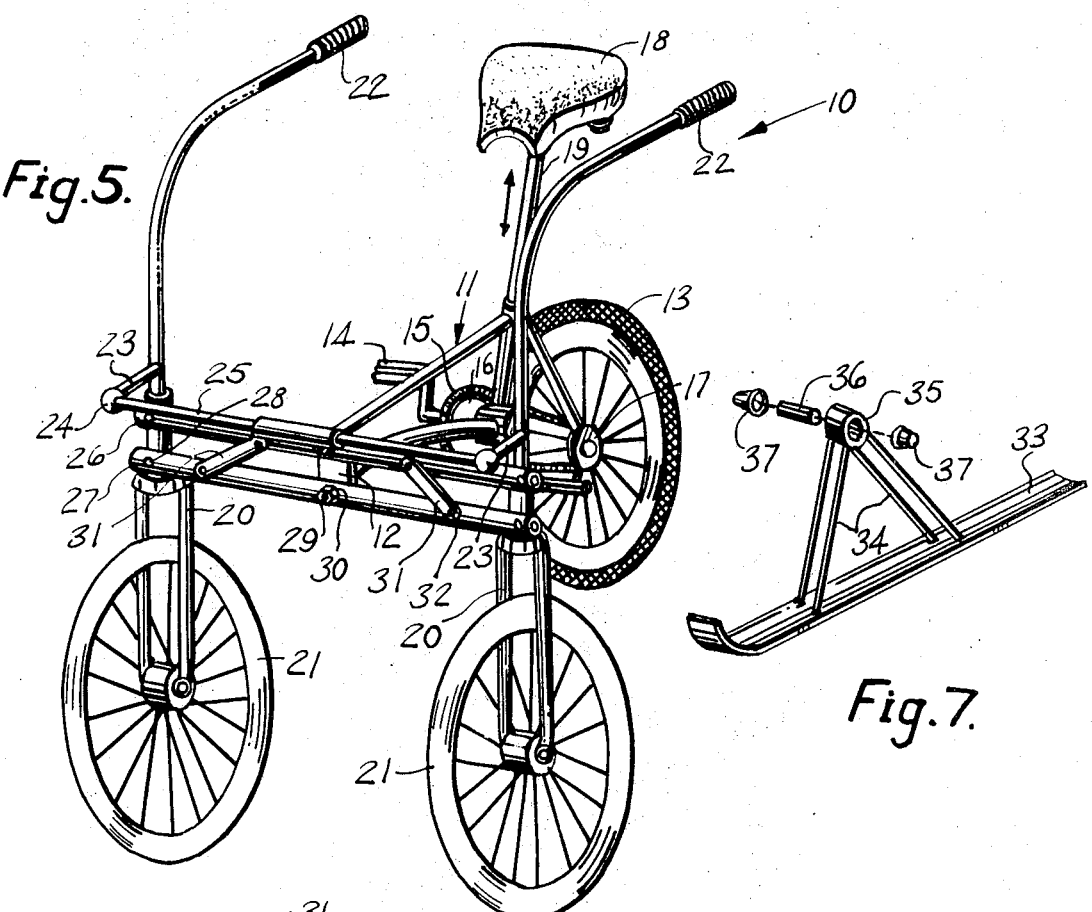
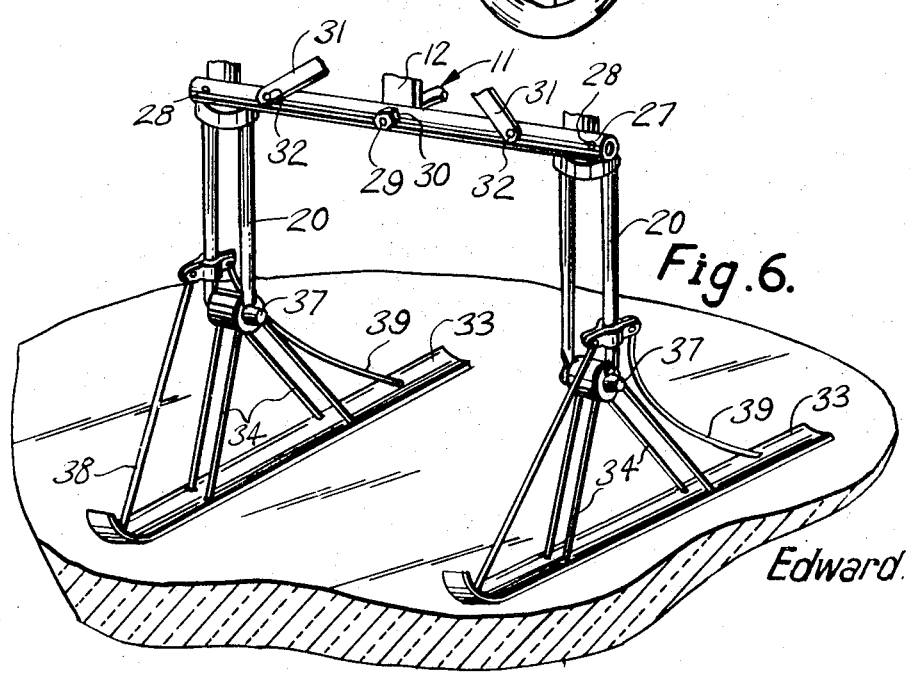

THREE WHEELED VEHICLE

This invention relates to tricycle-type vehicles and more particularly to a stable and versatile 3-wheeled vehicle.

The main purpose of this invention is to provide a 3-wheeled vehicle which will be novel in construction and extremely stable operation.

Another object of this invention is to provide a 3-wheeled vehicle which will have a pair of parallel front fork members, the upper portions of the fork members serving as handle grips for the rider.

Yet another object of this invention is to provide a 3-wheeled vehicle which will have parallel and horizontal crossbar members which will keep the fork members constantly parallel when banking the vehicle into a turn.

A further object of this invention is to provide a novel vehicle which will allow the rider at a substantial speed to maintain his balance as he would with an ordinary bicycle and will allow the rider to have more self-confidence and mechanical stability when banking while turning.

Other objects of the present invention are to provide a 3-wheeled vehicle which is simple in design, inexpensive to manufacture, rugged in construction, easy to use and efficient in operation.

These and other objects will be readily evident upon a study of the following specification together with the accompanying drawings wherein:

FIG. 1 is a front view of the present invention;

FIG. 2 is a front view of the instant invention shown in banking position while executing a turn;

FIG. 3 is an enlarged fragmentary view of the horizontal crossbar and locking brace members shown in FIG. 1;

FIG. 4 is a diagrammatic view of the invention shown executing a 360° turn;

FIG. 5 is a perspective view of the invention;

FIG. 6 is a fragmentary perspective view of the front end of the vehicle showing ski members attached to the fork members after the removal of the wheels; and FIG. 7 is a perspective view of one of the skis shown in FIG. 6 showing the axle and fasteners exploded for clarity.

According to this invention, a 3-wheeled vehicle 10 is provided with a lightweight tubular metal frame 11, the forward end of which is suitably secured a metal plate 12 for a purpose which hereinafter will be described. To the rear of frame 11 is secured in a conventional manner, the drive wheel 13 which is rotated by means of pedals 14, chain 15, sprocket 16 and sprocket 17. Frame 11 is provided with an adjustable seat 18 attached to seat post 19 in order for the rider to seat himself upon the vehicle. A pair of parallel spaced apart forks 20 carrying the freely rotatable front wheels 21. The upper extremity of forks 20 are provided with handle grips 22. A right-angle extension 23 of the upper portions of fork 20 has a ball and socket joint 24 which carries the horizontal rod 25. A pair of parallel spaced apart tubes 26 and 27 are pivotably secured to fork 20 by pivot pins 28. Parallel tubes 26 and 27 are secured pivotably to plate 12 by means of studs 29 which thread into nuts 30. A pair of spaced apart and pivotable locking braces 31 are pivotably secured to tube 26 and the free end of locking braces 31 are adapted to engage pins 32 extending from tube 27, these locking braces 31 when in place upon pins 32 will prevent vehicle 10 from banking if desired.

In operation, the rider sits himself upon the seat 18 and grasps the handle grips 22 of vehicle 10. The rider then places his feet upon the pedals 14 and then by urging downwards upon the pedals 14, he will rotate the sprocket 16 which by of the chain 15 will rotate the drive wheel 13 in order to propel vehicle 10 forward in the well-known manner. When the rider wishes to execute a turn, he will pivot the forks 20 by means of the handle grips 22 in the direction desired, whereupon the tubes 26 and 27 will pivot upon the pins 28 of forks 20 and thus vehicle 10 may be banked into the turn in a similar manner as that of a conventional bicycle. Simultaneously, rod 25 changes position within the ball and socket joint 24. This frontal arrangement thus allows a rider to effectively turn vehicle 10 with a banking motion which provides stability in the turn which may not be accomplished with a common tricycle at substantial speeds.

It shall be noted that when vehicle 10 is stopped with the rider aboard, the rider then has to hold onto the handle grips 22 to prevent vehicle 10 from falling over on its side when the rider's feet are upon the pedal 14.

It shall further be noted that if desired, the locking braces 31 may be lowered and engage with pins 32 of tube 27, thus preventing vehicle 10 from banking and allowing the vehicle to remain upright at all times, but to do so, will prevent stable turning of vehicle 10 at high speeds.

Looking now at FIGS. 6 and 7 of the drawings, one will see how skis 33 are adapted to vehicle 10 in the place of wheels 21. For use on ice and snow, skis 33 are provided with angular struts 34 which are suitably secured to hub 35 which receives pin 36, the ends of which receive threaded nut fasteners 37. Nut fasteners 37 thus serve to secure skis 33 to fork 20 of vehicle 10. To the forward portion of skis 33 are secured an elastic cord 38. To the rear of skis 33 is secured a slack safety cable 39, both the elastic cord 38 and the slack safety cable 39 are secured at the other ends to clamp 40 which is clamped to fork 20. The elastic cord 38 serves to tip the forward portion of ski 33 upwards when they are off the ground going over a bump, thus preventing the skis 33 from digging into the snow when they recontact the snow or ice surface. The slack safety cable 39 serves to limit the tipping up of the skis 33 when they travel over a bump.

It shall be recognized that the design of vehicle 10 is such that the seat 18 is positioned over the rear drive wheel 13 in order that the rider's weight will provide maximum traction for the drive wheel 13 when vehicle 10 is in use on ice or snow.

I claim:

1. A three wheeled vehicle, comprising in combination, a tubular frame mounted at its rear end upon a drive wheel, a pair of rotatable pedals supported on said frame, said drive wheel being secured on a drive shaft having a sprocket secured thereto, said pedals being rotatable about a shaft having a second sprocket secured thereto, an endless chain passed around said sprockets, an adjustable seat mounted upon said frame, said frame including a forwardly extending bar secured at its forward end to a plate, a pair of transverse extending tubes being centrally mounted pivotably free on said plate, said tubes being parallel to each other and spaced apart, the opposite ends of said tubes being attached pivotably free to a pair of vertically extending forks each having a lower portion thereof bifurcated and supporting an axle upon which a freely rotatable front wheel is mounted, an upper portion of each said fork extending upwardly and having a rearward extending terminal portion with a hand grip secured thereto, each said upward extending portion of said forks having a forward extension secured thereto which has a ball and socket joint at a forward end that is attached pivotably to opposite ends of a transverse horizontal tie rod, and a pair of spaced apart braces attached pivotably at their ends to one of said tubes, the free ends of each of said braces being selectively engageable on pins mounted on the other said tube, and said front wheels being selectively interchangeable by skiis for travel on ice or snow, and an elastic pull cord being secured to a forward end of said skiis to raise the same over a bump surface.